(12) United States Patent
Kura

(10) Patent No.: US 8,292,711 B2
(45) Date of Patent: Oct. 23, 2012

(54) MOVING PICTURE PROCESSING DEVICE AND PROGRAM

(75) Inventor: Shuichi Kura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 791 days.

(21) Appl. No.: 12/446,598

(22) PCT Filed: Oct. 26, 2007

(86) PCT No.: PCT/JP2007/070886
§ 371 (c)(1),
(2), (4) Date: Apr. 23, 2009

(87) PCT Pub. No.: WO2008/053795
PCT Pub. Date: May 8, 2008

(65) Prior Publication Data
US 2010/0029354 A1   Feb. 4, 2010

(30) Foreign Application Priority Data
Oct. 30, 2006   (JP) .................................. 2006-294463

(51) Int. Cl.
A63F 9/24   (2006.01)
(52) U.S. Cl. ................................ 463/9; 463/43; 386/239
(58) Field of Classification Search .................. 463/3, 9, 463/43; 386/239, E5.065
See application file for complete search history.

(56) References Cited

U.S. PATENT DOCUMENTS

| | | | |
|---|---|---|---|
| 5,185,666 A * | 2/1993 | Capitant et al. ............... | 348/588 |
| 5,627,656 A * | 5/1997 | Sonohara et al. ............ | 386/201 |
| 6,267,379 B1 | 7/2001 | Forrest et al. | |
| 6,317,885 B1 | 11/2001 | Fries .............................. | 725/109 |
| 6,435,880 B1 | 8/2002 | Tsumori et al. ............... | 434/323 |
| 2004/0013398 A1 | 1/2004 | Miura et al. | |
| 2005/0069225 A1 | 3/2005 | Schneider et al. ............ | 382/305 |

FOREIGN PATENT DOCUMENTS

| | | |
|---|---|---|
| JP | 9-23411 A | 1/1997 |
| JP | 11-66272 A | 3/1999 |
| JP | 11-85001 | 3/1999 |
| JP | 11-85001 A | 3/1999 |
| JP | 2000-023030 A | 1/2000 |
| JP | 2001-60058 A | 3/2001 |
| JP | 2002-344904 A | 11/2002 |

(Continued)

OTHER PUBLICATIONS

Korean Office Action for Korean Patent Application No. 10-2009-7011029, dated Apr. 13, 2011 with English translation. International Search Report issued Jan. 15, 2008 in International Application No. PCT/JP2007/070886.

(Continued)

Primary Examiner — Brook Kebede
(74) Attorney, Agent, or Firm — Sughrue Mion, PLLC

(57) ABSTRACT

There is provided a moving picture processing device (100) that has a display unit (120), a main processor (150), a display control unit (160), and a main memory (180). Using an overall-moving-picture data item stored in the main memory (180), the display control unit (160) and the display unit (120) play the overall moving picture (AM1), whereby a plurality of sectional moving pictures (SM11 to SM14) is displayed. In other words, displaying one moving picture enables a plurality of moving pictures to be displayed. Therefore, by using the moving picture processing device (100), it is possible to simultaneously display more moving pictures than those determined depending on the device's capacity to play moving pictures.

9 Claims, 7 Drawing Sheets

FOREIGN PATENT DOCUMENTS

| | | |
|---|---|---|
| JP | 2003-29610 A | 1/2003 |
| JP | 2004-144903 A | 5/2004 |
| JP | 2005-253871 A | 9/2005 |
| JP | 2006-208784 A | 2/2006 |
| JP | 2006-055294 A | 3/2006 |
| JP | 2006-92079 A | 4/2006 |
| JP | 2006-163579 A | 6/2006 |
| WO | WO 97/37497 A1 | 10/1997 |
| WO | WO 02/19718 A1 | 3/2002 |

OTHER PUBLICATIONS

Office Action from Japanese Patent Office in Japanese counterpart application No. 2006-294463, mailed Jan. 8, 2008 (with English translation).

Office Action from Japanese Patent Office in Japanese counterpart application No. 2006-294463, mailed Jun. 17, 2008 (with English translation).

Supplementary European Search Report EP 07 83 0620 dated May 6, 2010.

\* cited by examiner

MOVING PICTURE PROCESSING DEVICE AND PROGRAM

CROSS-REFERENCE TO RELATED APPLICATIONS

This application is a 371 filing of International Patent Application PCT/JP2007/70886 filed Oct. 26, 2007 which claims priority to Japanese Patent Application No. 2006-294463 filed Oct. 30, 2006, the disclosures of each of which are incorporated herein by reference.

TECHNICAL FIELD

The present invention relates to moving picture processing devices and programs.

BACKGROUND ART

JP-A-2006-055294 discloses a game device that asks a human player a question and displays choices of answers to the question. The game device accepts at least one choice from among the choices of answers selected by the user and determines whether or not the selected choice is correct, thereby conducting a quiz process for advancing a game. This game device simultaneously displays a plurality of still images as the choices of answers on its display.

DISCLOSURE OF INVENTION

Problem to be Solved by Invention

In order to attract players' interests, it is conceivable to modify the above game device to provide another game device such that it simultaneously displays a plurality of moving pictures as the choices of answers. However, no device can simultaneously play more moving pictures than those determined depending on the capacity to play. Therefore, naturally, there are restrictions on such a game device in providing the number of choices of answers or on the image quality, depending on its ability to play moving pictures. This applies not only to game devices, but also to any moving picture processing devices that display a plurality of moving pictures as choices, and that accept a user's selection of at least one choice to be used from among the choices.

In order to solve the above problem, the present invention provides a moving picture processing device and a program that can simultaneously display more moving pictures than those determined depending on the capacity to play moving pictures.

Means for Solving the Problems

The present invention will be described below. In order for the present invention to be easily understood, reference signs in the attached drawings are added in parentheses. However, this is not intended to limit the scope of the present invention to the illustrated embodiments.

The present invention provides a moving picture processing device (100) including: an overall-moving-picture memory (180) into which an overall-moving-picture data item for use in playing an overall moving picture (AM1) is written, the overall moving picture occupying an image area (AR) including a plurality of sectional areas (SR1 to SR4) that do not overlap each other, the overall moving picture having a playing time and including a plurality of sectional moving pictures each having a playing time that is the same as the playing time of the overall moving picture, the sectional moving pictures being located at the sectional areas, respectively; a moving-picture player (160, 120) for playing the overall moving picture using the overall-moving-picture data item written into the overall-moving-picture memory; a location data memory (180) into which a location data item is written, the location data item describing locations of the plurality of sectional moving pictures (SM11 to SM14) within the overall moving picture, the location data item describing a correlation between the plurality of sectional areas and the plurality of sectional moving pictures; a selection acceptor (150) for accepting selection of at least one sectional area from among sectional areas by a user; a sectional-moving-picture determiner (150) for determining, among the plurality of sectional moving pictures, a sectional moving picture correlated with the sectional area accepted by the selection accepter on the basis of the location data item written into the location data memory; and an information outputter (150, 160, 120, 130) for outputting information in accordance with the sectional moving picture determined by the sectional-moving-picture determiner.

In this moving picture processing device, the moving-picture player (160, 120) plays the overall moving picture (AM1) using the overall-moving-picture data item, thereby displaying the plurality of sectional moving pictures (SM11 to SM14). In other words, according to this moving picture processing device, displaying a single moving picture enables a plurality of moving pictures to be displayed. Therefore, by using the moving picture processing device, it is possible to simultaneously display more moving pictures than those determined depending on the device's capacity for playing moving pictures.

The information output from the information outputter (150, 160, 120, 130), may be light, sound, vibration, and other suitable information that human beings can perceive. The output information in the form of light may be the blinking of a light emitting diode (LED) or the displaying of an image. Here, the term "image" may include not only a still image, but also a moving picture. The output information in the form of sound may be, not only sounding of a speaker, but also driving a sound generating mechanism by a solenoid (for example, the sound of a bell). The output information in the form of vibration may be driving a vibrator. When the information output by the information outputter (150, 160, 120, 130) is displaying an image, the information outputter (150, 160, 120, 130) may use the moving-picture player (160, 120) for outputting the information.

"The sectional moving pictures being located at the sectional areas, respectively" means that at least a part of one sectional moving picture overlaps with at least a part of one sectional area and that the sectional moving picture does not overlap with other sectional areas. Therefore, the area occupied by each of the plurality of sectional moving pictures (SM11 to SM14) may accord with the sectional area that corresponds to the sectional moving picture, or may be larger or smaller than the sectional area that corresponds to the sectional moving picture. The plurality of sectional areas (SR1 to SR4) may or may not have the same size and the same shape (be congruent). The moving-picture player (160, 120) may start playing the overall moving picture (AM1) using the overall-moving-picture data item after the whole overall-moving-picture data item is written into the overall-moving-picture memory (180), or may start playing the overall moving picture (AM1) using the overall-moving-picture data item before a part of the overall-moving-picture data item is written into the overall-moving-picture memory (180).

The above-mentioned moving picture processing device (100) may further include an original-picture-data memory (170) for storing in advance a plurality of original sectional-moving-picture data items that are originals of a plurality of sectional-moving-picture data items indicating the plurality of sectional moving pictures (SM11 to SM14) within the overall moving picture (AM1); an initial location data memory (170) for storing in advance an initial location data item describing an initial correlation between the plurality of sectional areas (SR1 to SR4) and the plurality of sectional moving pictures (SM11 to SM14); a picture location determiner (150) for determining locations of the sectional moving pictures within the overall moving picture; an overall-moving-picture generator (150) for generating, from the original sectional-moving-picture data items read from the original-picture-data memory, the overall-moving-picture data item indicating the overall moving picture including the sectional moving pictures that are located in accordance with the determination by the picture location determiner, the overall-moving-picture generator writing the overall-moving-picture data item into the overall-moving-picture memory; and a location data modifier (150) for reading the initial location data item from the initial location data memory, and for modifying the initial correlation between the plurality of sectional areas (SR1 to SR4) and the plurality of sectional moving pictures (SM11 to SM14) described in the initial location data item on the basis of the locations determined by the picture location determiner, thereby generating a new location data item, the location data modifier writing the new location data item into the location data memory.

In this embodiment, the overall-moving-picture generator (150) locates the sectional moving pictures within the overall moving picture based on the arrangement determined by the picture location determiner (150), and the location data modifier (150) modifies the correlation between the plurality of sectional areas (SR1 to SR4) and the plurality of sectional moving pictures (SM11 to SM14) described in the initial location data item on the basis of the arrangement determined by the picture location determiner (150). Therefore, it is possible that the moving picture processing device manages the correlation between the plurality of sectional areas (SR1 to SR4) and the plurality of sectional moving pictures (SM11 to SM14), and at the same time plays an overall moving picture (AM1) in which the sectional moving pictures are located at sectional areas that are different from the description of the initial location data item. As a result, in this embodiment, by using a single set of the original sectional-moving-picture data items, it is possible to play a variety of overall moving pictures (AM1). This contributes to obtaining suitable game results in, for example, a game device for conducting a quiz game in which the same question is asked repeatedly. More specifically, whenever a question is asked repeatedly, the location of the correct answer is randomly changed, whereby an unsuitable situation in which a human player who remembers the location of the correct answer can answer correctly is unlikely to happen.

Preferably, the original-picture-data memory (170) stores in advance an original overall-moving-picture data item including the plurality of original sectional-moving-picture data items, the original overall-moving-picture data item indicating an original overall moving picture (AM2) in which the plurality of sectional moving pictures (SM21 to SM24) are located in accordance with the initial correlation described in the initial location data item; and the overall-moving-picture generator (150) generates the overall-moving-picture data item by changing, on the basis of the determination by the picture location determiner (150), a description of locations of the sectional moving pictures (SM21 to SM24) in the original overall-moving-picture data item read from the original-picture-data memory. In this embodiment, the overall-moving-picture generator (150) generates the overall-moving-picture data item by changing the locations of the sectional moving pictures in the original overall moving picture on the basis of the locations determined by the picture location determiner (150), and the location data modifier (150) modifies the correlation between the plurality of sectional areas (SR1 to SR4) and the plurality of sectional moving pictures (SM11 to SM14) described in the initial location data item on the basis of the locations determined by the picture location determiner (150). Therefore, it is possible that the moving picture processing device manages the correlation between the plurality of sectional areas (SR1 to SR4) and the plurality of sectional moving pictures (SM11 to SM14), and at the same time plays an overall moving picture (AM1) in which the sectional moving pictures are located at sectional areas that are different from the description of the initial location data item. As a result, in this embodiment, by using a single overall-moving-picture data item, it is possible to play a variety of overall moving pictures (AM1). This contributes to obtaining suitable game results in, for example, a game device for conducting a quiz game in which the same question is asked repeatedly. More specifically, whenever a question is asked repeatedly, the location of the correct answer is randomly changed, whereby an unsuitable situation in which a human player who remembers the location of the correct answer can answer correctly is unlikely to happen.

In the above embodiment, the overall-moving-picture generator (150) may generate the overall-moving-picture data item in such a manner that the overall-moving-picture data item includes a boundary picture data item indicating a boundary picture (DM), the boundary picture being a picture of a boundary for dividing the plurality of sectional moving pictures (SM11 to SM14).

In this embodiment, each of the plurality of sectional moving pictures (SM11 to SM14) is easily recognized as a separate moving picture.

Preferably, the boundary picture (DM) is a moving picture displayed by showing the same still image repeatedly, and the boundary picture (DM) may be a moving image occupying the areas extending along the boundaries of the plurality of sectional areas (SR1 to SR4). At least one of the plurality of sectional moving pictures (SM11 to SM14) may include a part of the boundary picture (DM), or all of the sectional moving pictures (SM11 to SM14) may exclude the boundary picture (DM). In the former case, the sectional moving picture (at least one of SM11 to SM14) including a part of the boundary picture (DM) is not the same as the sectional moving picture (at least one of SM21 to SM24) in the original overall moving picture that corresponds to the sectional moving picture (at least one of SM11 to SM14). In the latter case, each of the plurality of sectional moving pictures (SM11 to SM14) is the same as each of the sectional moving pictures (SM21 to SM24) in the original overall moving picture that correspond to the sectional moving pictures (SM11 to SM14).

In each of the above embodiments, the original overall-moving-picture data item stored in the original-picture-data memory (170) may be compression-coded, and the overall-moving-picture generator (150) may decode the original overall-moving-picture data item read from the original-picture-data memory prior to the generation of the overall-moving-picture data item.

In this embodiment, it is possible to lower the requirement of storage capacity for the original-picture-data memory (170).

In each of the above-mentioned embodiments of moving picture processing device (100), it is possible to include a question asker (150) for asking a human player a question; a presenter (150) for showing the plurality of sectional moving pictures (SM11 to SM14) as choices of answers to the question by causing the moving-picture player (160, 120) to play the overall moving picture (AM1); and a correct answer memory (170) for storing a correct answer data item indicating a correct choice of answer, and the information outputter (150, 160, 120, 130) may determine whether or not the sectional moving picture (SM11 to SM14) determined by the sectional-moving-picture determiner is the correct choice of answer on the basis of the sectional moving picture (SM11 to SM14) determined by the sectional-moving-picture determiner and the correct answer data item stored in the correct answer memory (170), and the information outputter may output information in accordance with the determination thereof.

In this embodiment, it is possible to conduct the above-mentioned quiz process.

The present invention also provides a computer program (P) used in a computer including: an overall-moving-picture memory (180) into which an overall-moving-picture data item for use in playing an overall moving picture (AM1) is written, the overall moving picture occupying an image area (AR) including a plurality of sectional areas (SR1 to SR4) that do not overlap each other, the overall moving picture having a playing time and including a plurality of sectional moving pictures each having a playing time that is the same as the playing time of the overall moving picture, the sectional moving pictures being located at the sectional areas, respectively; a moving-picture player (160, 120) for playing the overall moving picture using the overall-moving-picture data item written into the overall-moving-picture memory; and a location data memory (180) into which a location data item is written, the location data item describing locations of the plurality of sectional moving pictures (SM11 to SM14) within the overall moving picture, the location data item describing a correlation between the plurality of sectional areas and the plurality of sectional moving pictures. The computer program causes the computer to serve as: a selection acceptor (150) for accepting selection of at least one sectional area from among sectional areas by a user; a sectional-moving-picture determiner (150) for determining, among the plurality of sectional moving pictures, a sectional moving picture correlated to the sectional area accepted by the selection accepter on the basis of the location data item written into the location data memory; and an information outputter (150) for outputting information in accordance with the sectional moving picture (SM11 to SM14) determined by the sectional-moving-picture determiner.

According to the computer (device) executing this program (P), in the same way as in the moving picture processing device (100), it is possible to simultaneously display more moving pictures than those determined depending on the device's capacity to play moving pictures.

Effects of Invention

According to the present invention, it is possible to provide a moving picture processing device and a program that can simultaneously display more moving pictures than those determined depending on the capacity to play moving pictures.

BEST MODE FOR CARRYING OUT INVENTION

With reference to the drawings, preferred embodiments of the present invention will be described. The specific structure described below is only an example, and the scope of the present invention covers various modifications of this specific structure.

Structure

Figure 1:
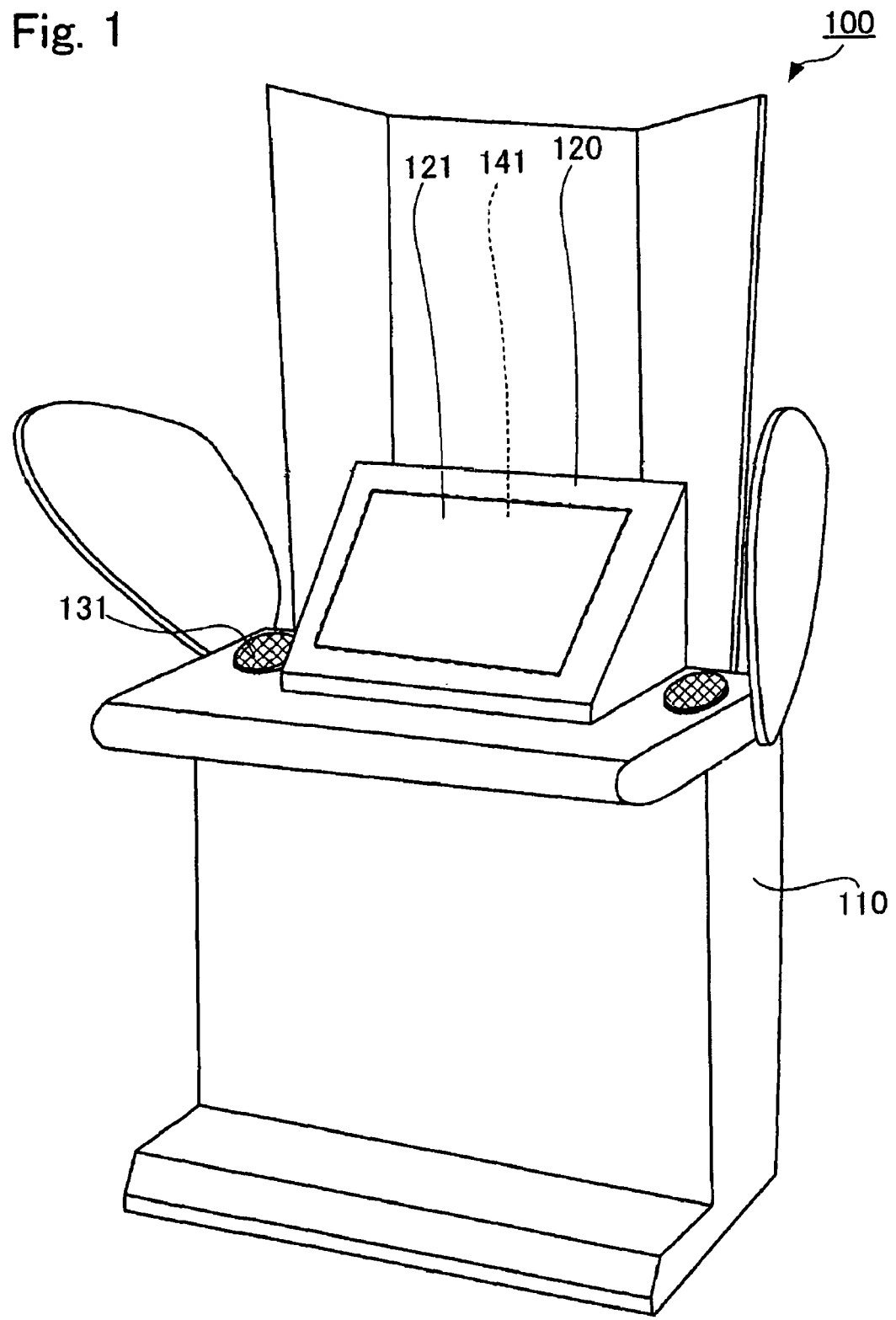
FIG. 1 is a diagram showing an appearance of a moving picture processing device according to an embodiment of the present invention.

FIG. 1 is a diagram showing the appearance of a moving picture processing device 100 according to an embodiment of the present invention. The moving picture processing device (computer) 100 is an arcade game machine (a game device) that advances a quiz game by executing a quiz process in which the device 100 asks a human player a question, displays choices of answers to the question, and accepts at least one choice from among the choices of answers selected by the human player. The moving picture processing device 100 is installed in a facility (game arcade) that offers games to visiting players. However, in another embodiment, functions of the moving picture processing device 100 may be realized in game machines (game devices) for household use.

The human player who plays the quiz game stands in front of the housing 110 of the moving picture processing device 100, looks at images shown on the screen 121 of a display unit (more specifically, a monitor) 120 provided in the housing 110, listens to sound emitted by speakers 131 provided in the housing 110, and understands questions asked and choices of answers displayed. The human player touches, within the screen 121 occupied by an image for prompting the human player to select a desired choice of answer, a sectional area corresponding to the desired choice of answer, thereby selecting the sectional area. In order to enable the selection by touch, the screen 121 is covered with a transparent touch panel 141.

Figure 2:
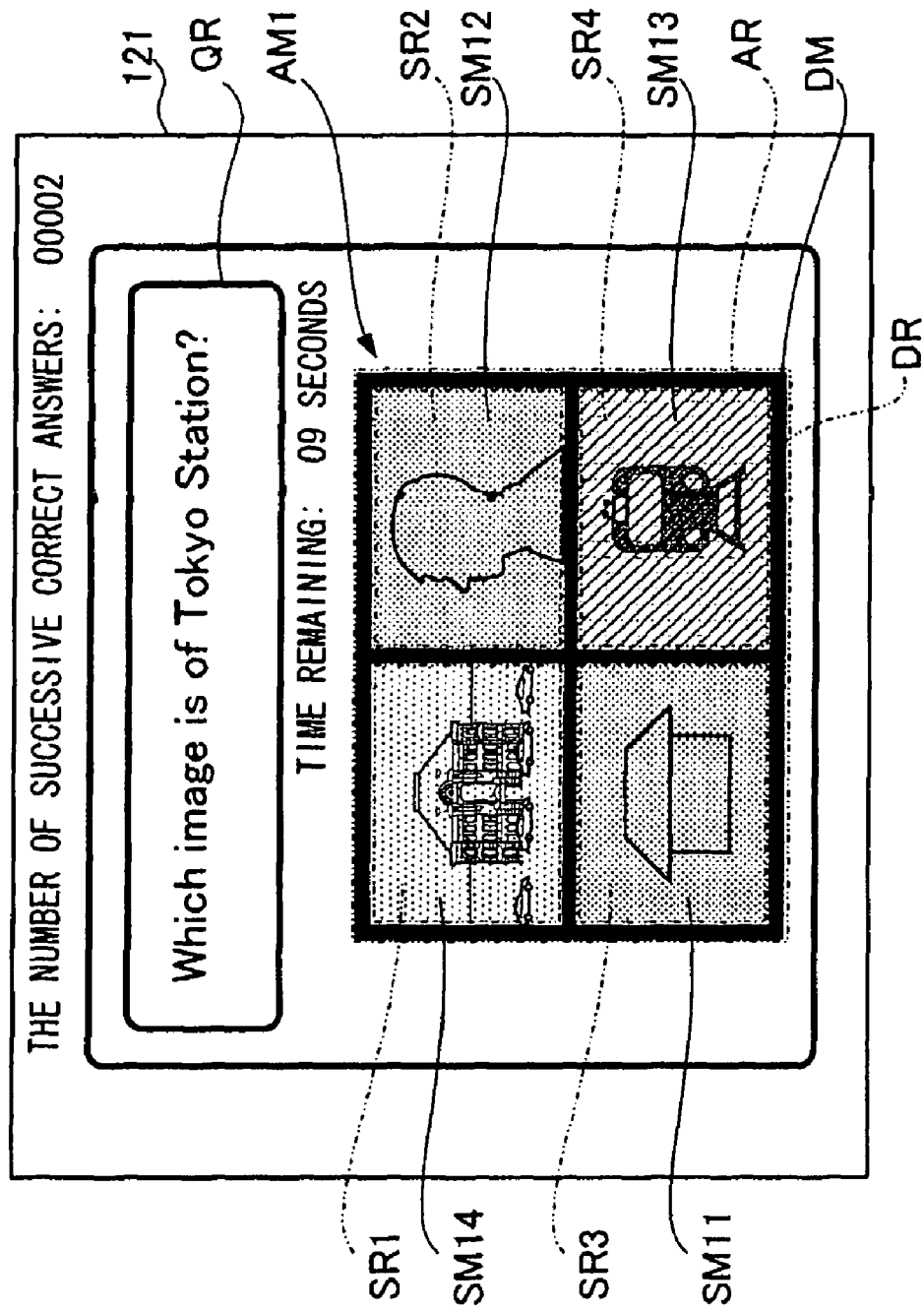
FIG. 2 is a diagram showing an example of images shown on a screen of the moving picture processing device in FIG. 1.

FIG. 2 is a diagram showing an example of images shown on the screen 121 of the moving picture processing device 100. In the quiz game of the present embodiment, human players are required to select, from among choices of answers displayed, a suitable choice of answer to questions asked. A question sentence (for example, "Which image is of Tokyo Station?") corresponds to a "question", and displaying pictures for the question sentence corresponds to "asking a question".

Provided on the screen 121 are a question area QR which is an image area showing an image representing a question sentence, and a group-of-choice area AR which is an image area occupied by an overall moving picture AM1 including moving pictures representing choices of answers (indicated by an overall-moving-picture data item). The group-of-choice area AR is divided into a plurality of sectional-moving-picture areas SR1 to SR4 (choice-of-answer areas) and a boundary picture area DR. The sectional-moving-picture areas SR1 to SR4 are respectively delimited by rectangles, which do not overlap each other, within the group-of-choice area AR. The boundary picture area DR shows frame lines (or boundary lines) separating the sectional-moving-picture areas from one another. The sectional-moving-picture areas SR1 to SR4 are occupied by sectional moving pictures SM11 to SM14 which are moving pictures representing choices of answers. The size of each sectional moving picture SM11 to SM14 may be the same as that of each of the sectional-moving-picture areas SM11 to SM14, or be larger or smaller than that of each of the sectional-moving-picture areas SM11 to SM14.

Each of the plurality of sectional moving pictures SM11 to SM14 is a moving picture having the same playing time as that of the overall moving picture AM1, and is included in the overall moving picture AM1. The sectional moving pictures SM11 to SM14 are correlated with the plurality of sectional-moving-picture areas SR1 to SR4, respectively, by a location data item that will be described later. The boundary picture area DR is occupied by a boundary picture DM which is a moving picture representing frame lines (or boundary lines) separating the sectional moving pictures SM11 to SM14 from one another. The sectional-moving-picture areas SR1 to SR4 are apart from each other, and are apart from the outline of the group-of-choice area AR. In other words, each of the sectional-moving-picture areas SR1 to SR4 is surrounded by the boundary picture area DR extending along the boundaries of the sectional-moving-picture areas SR1 to SR4.

Figure 3:
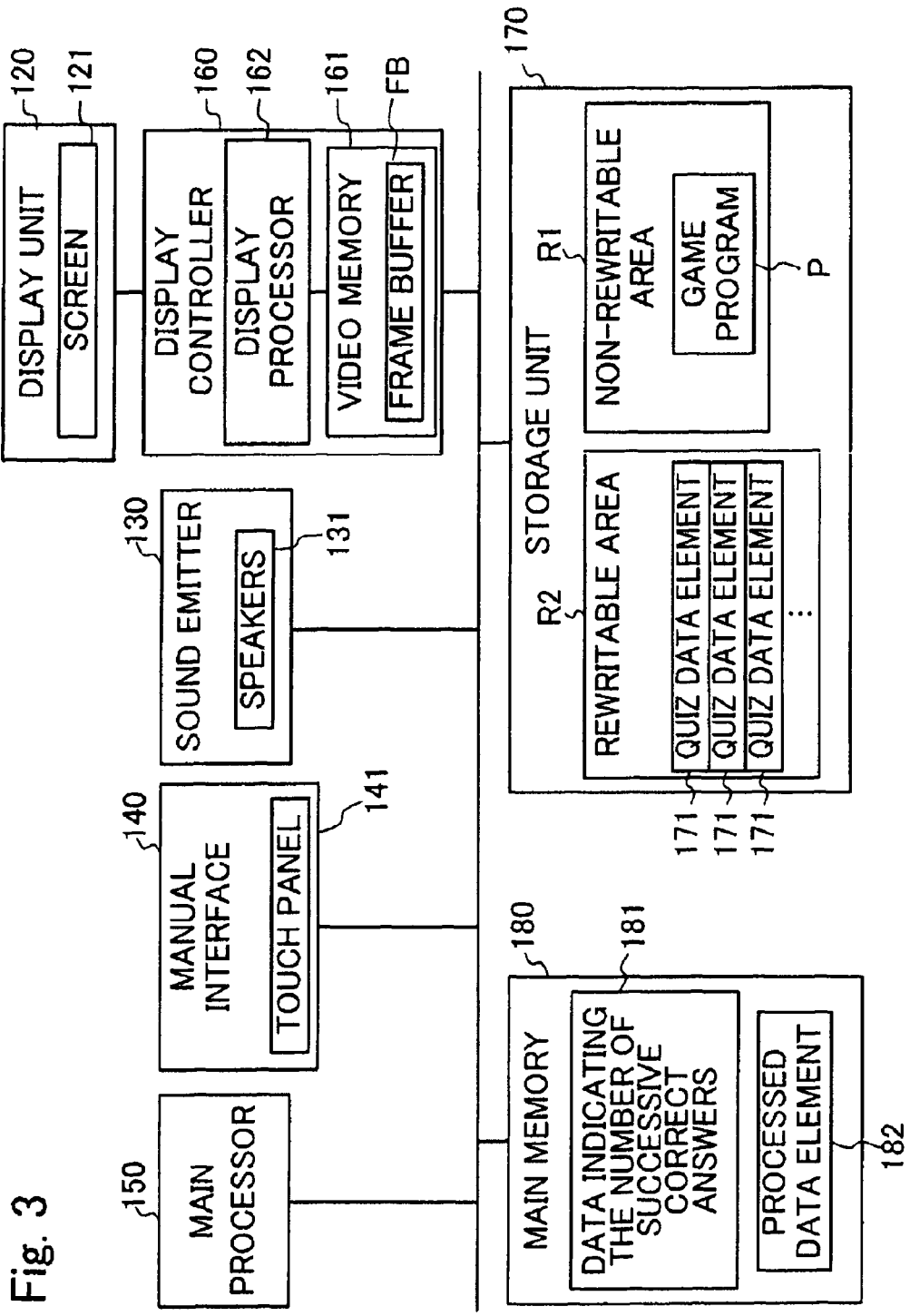
FIG. 3 is a block diagram showing a structure of the moving picture processing device in FIG. 1.

FIG. 3 is a block diagram showing a structure of the moving picture processing device 100. As shown in FIG. 3, the moving picture processing device 100 includes a main processor 150 (selection acceptor, sectional-moving-picture determiner, picture location determiner, information outputter, overall-moving-picture generator, location data modifier, question asker, and presenter) for executing a game program P, which will be described later; a manual interface 140 which is manipulated by the human player and supplies to the main processor 150, manipulation data based on the manipulation by the human player; a display controller 160 (moving-picture player and information outputter) for receiving instructions, processing images on the basis of the instructions, and supplying image signals to a display unit 120 (moving-picture player and information outputter); the display unit 120 for displaying on the screen 121 moving pictures based on the image signals supplied from the display controller 160; a sound emitter 130 (information outputter) for emitting from the speakers 131 sound based on sound data supplied from the main processor 150; a storage unit 170 (original-picture-data memory, initial location data memory, and correct answer memory) for storing various data items; and a main memory 180 (overall-moving-picture memory and location data memory) used for a work area.

The main processor 150 is constituted of, for example, one or more CPUs (central processing units). The manual interface 140 has the touch panel 141. The touch panel 141 supplies to the main processor 150 manipulation data depending on a position touched by the human player. However, in another embodiment, a video projector may be used for the display unit 120. In this case, a screen on which images are projected is used instead of the screen 121, and the manual interface 140 is provided with a keyboard and buttons (not shown) instead of the touch panel 141.

The display controller 160 has a display processor 162 and a video memory 161 for storing various data to supply the image signals to the display unit 120. The video memory 161 is realized by for example a RAM (random access memory), and its storage area has a frame buffer FB that stores image data for one screen image (one frame).

The display processor 162 (graphics processing unit) receives instructions, processes images on the basis of the instructions, and supplies image signals to the display unit 120. Image signals are supplied by the display processor 162 by conducting repeatedly at predetermined time intervals (for example at intervals of 30 seconds or 60 seconds) reading image data for one screen image (one frame) from the frame buffer FB and supplying it to the display unit 120.

Instructions supplied to the display processor 162 include a display instruction and a stop instruction. An image process based on the display instruction is a display process, whereas an image process based on the stop instruction is a stop process. The display process is a process of writing image data into the frame buffer FB. A kind of the display process is a moving picture playing process for playing a moving picture. A kind of the display instruction is a moving picture display instruction for instructing the moving picture playing process. A moving picture display instruction includes a moving picture specifying data item for specifying moving picture data to be played and an area specifying data item for specifying a rectangular image area occupied by the moving picture played in accordance with the moving picture data. In the moving picture playing process, the display processor 162 writes a plurality of image data items (corresponding to the plurality of sectional moving pictures SM11 to SM14) into a storage area in the frame buffer FB one by one sequentially. The plurality of image data items are used for displaying a plurality of rectangular images which constitute a moving picture played in accordance with moving picture data specified by the moving picture specifying data item, whereas the storage area corresponds to the image area specified by the area specifying data item. In the stop process, the display processor 162 stops the moving picture playing process that is being executed.

However, in another embodiment, the main processor 150 may also serve as the display processor 162, whereas the main memory 180 may also serve as the video memory 161. In this case, the main processor 150 executes a program for conducting processes similar to those conducted by the display processor 162.

The storage unit 170 does not require power to hold its contents. The storage area of the storage unit 170 is divided into a non-rewritable area R1 in which stored contents cannot be rewritten and a rewritable area R2 in which stored contents can be rewritten. The non-rewritable area R1 is realized by, for example, a ROM (read only memory), whereas the rewritable area R2 is realized by, for example, a hard disc.

The non-rewritable area R1 stores the game program P. The game program P is executed by the main processor 150 to cause the moving picture processing device 100 to perform a game process that will be described later. The rewritable area R2 stores a large number of quiz data elements 171. The quiz data element 171 is data used for asking a question, displaying choices of answers, and determining whether the selected choice of answer is correct or not. Each quiz data element 171 is prepared for each question.

Figure 4:
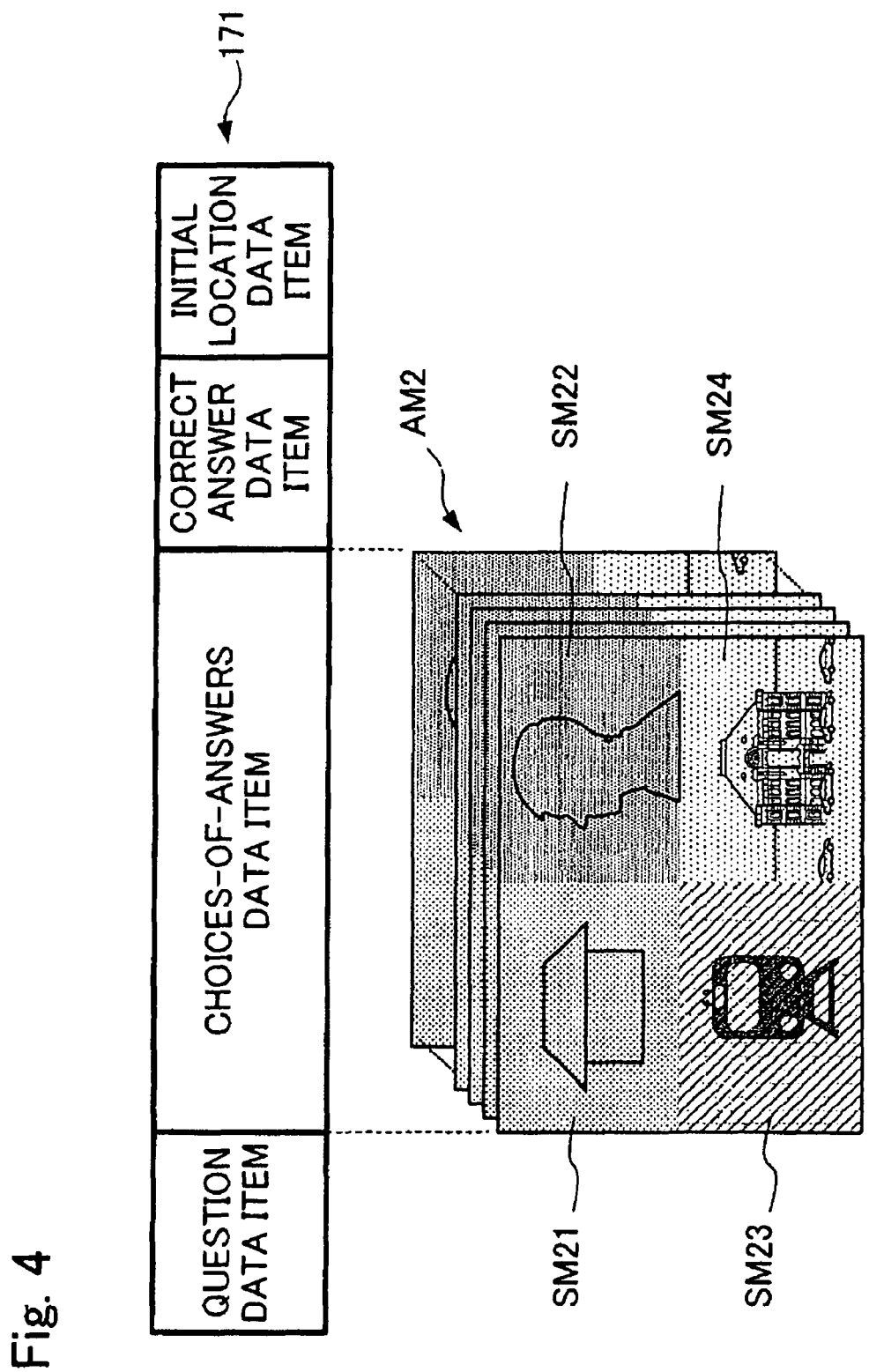
FIG. 4 is a schematic diagram showing a structure of a quiz data element used in the moving picture processing device of FIG. 1.

FIG. 4 is a schematic diagram showing the structure of the quiz data element 171 stored in advance in the rewritable area R2 of the storage unit 170 (original-picture-data memory, initial location data memory, and correct answer memory) and used in the moving picture processing device 100. Each of the quiz data element 171 contains a question data item for asking a question, a choices-of-answers data item (original overall-moving-picture data item) for presenting choices of answers to the question, a correct answer data item used for determining whether the human player's choice is correct or not, and an initial location data item indicating the arrangement of the choices of answers on the screen.

The question data item is data used for displaying an image representing a question sentence, and may be in the form of text or image. The correct answer data item is, more specifically, data identifying the correct answer. In this embodiment, each question has one correct choice of answer. However, in another embodiment, the correct answer data item may indicate all incorrect choices of answers. Even in this case, the correct answer data item can be considered as data that indicates the correct answer.

The choices-of-answers data item is an original overall-moving-picture data item used for generating another overall-moving-picture data item used to play the overall moving picture AM1. The choices-of-answers data item is compression-coded by means of a known video compression technique. In this embodiment, the video compression technique is VC1 of SMPTE (the Society of Motion Picture and Television Engineers).

The choices-of-answers data item contains a plurality of original sectional-moving-picture data items that are originals of a plurality of sectional-moving-picture data items indicating the plurality of sectional moving pictures SM11 to SM14 within the overall moving picture AM1 that is played on the screen. The choices-of-answers data item indicates an original overall moving picture AM2 including original sectional moving pictures SM21 to SM24 located therein. In other words, using the choices-of-answers data item, the original overall moving picture AM2 can be played by a computer. In the original overall moving picture AM2 played the plurality of original sectional moving pictures SM21 to SM24, each of which has a playing time that is the same as the playing time of the original overall moving picture AM2, are located. The original overall moving picture AM2 occupies an image area that includes a plurality of sectional-moving-picture areas that are respectively delimited by a plurality of rectangles that do not overlap one another. The size and the locations of the sectional-moving-picture areas in the image area of the original overall moving picture AM2 are the same as those of the sectional-moving-picture areas SR1 to SR4 in the image area AR of the overall moving picture AM1 that is played on the screen. In these sectional-moving-picture areas, the original sectional moving pictures SM21 to SM24 are located in advance. The size of each of the sectional moving pictures SM21 to SM24 may be the same as that of the sectional-moving-picture areas, or larger or smaller than that of the sectional-moving-picture areas.

The initial location data is data that correlates the plurality of the sectional-moving-picture areas with the original sectional moving pictures SM21 to SM24 in the image area of the original overall moving picture AM2. As will be described later, by rearranging the original sectional moving pictures SM21 to SM24, an overall-moving-picture data item that indicates the overall moving picture AM1 including the sectional moving pictures SM11 to SM14 is generated. In other words, the initial location data item describes an initial correlation between the sectional-moving-picture areas SR1 to SR4 and the sectional moving pictures SM11 to SM14. In the original overall moving picture A2 played in accordance with the choices-of-answers data item, the plurality of original sectional moving pictures SM21 to SM24 are located in advance in accordance with the initial correlation described in the initial location data item.

The main memory 180 is realized by, for example, a RAM, and requires power to hold its contents. The main memory 180 temporarily stores data, such as data 181 indicating the number of successive correct answers by a single human player, and processed data element 182, which will be described later. As will be described below, in the game process, a quiz process and a determination process of determining whether or not the answer to the question is correct (hereinafter referred to as "correct answer determining process") are repeatedly conducted. The initial value of the number of successive correct answers is zero. Each time the answer to the asked question is determined to be correct, the number of successive correct answers is incremented by one, whereas each time the answer to the asked question is determined to be incorrect, the number of successive correct answers is returned to zero.

Game Process

Figure 5:
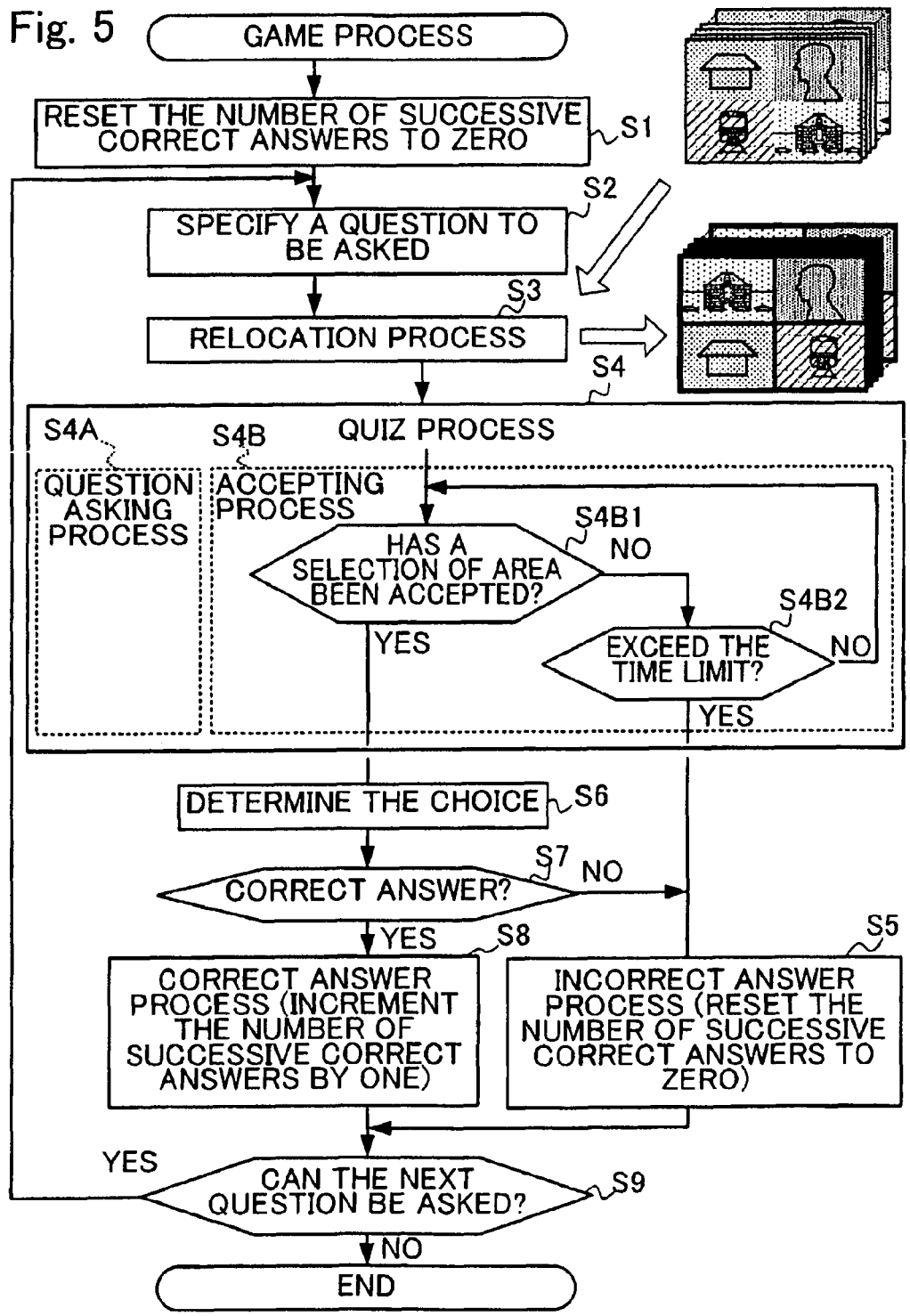
FIG. 5 is a flowchart showing a game process executed by a main processor of the moving picture processing device of FIG. 1.

FIG. 5 is a flowchart showing the game process executed by the main processor 150 of the moving picture processing device 100. As the main processor 150 conducts a game process, the quiz game in the moving picture processing device 100 progresses. In the game process, the main processor 150 first initializes the number of successive correct answers (S1). To be more precise, the main processor 150 stores the data 181 indicating zero as the number of successive correct answers in the main memory 180.

Then, the main processor 150 serves as a question asker for specifying a question to be asked in the next quiz process (S2). To be more precise, the main processor 150 selects a quiz data element 171 out of a large number of quiz data elements 171 stored in the rewritable area R2 of the storage unit 170. Any rule for specifying the next question can be used. For example, in a quiz game that has a series of questions, the next question may be specified so that the same question will not be asked, or the next question may be specified randomly.

The main processor 150 then conducts a relocation process (S3) that generates the processed data element 182 by relocating the sectional moving pictures. To be more precise, the main processor 150 reads the selected quiz data element 171 out of the storage unit 170, decodes (decompresses) it in accordance with VC1, processes it, and writes the processed quiz data element as the processed data element 182 into the main memory 180. The relocation process includes a modification of the moving-picture data item and a modification of the location data item. Before or in the process, the main processor 150 serves as a picture location determiner for determining randomly the locations of the sectional moving pictures SM11 to SM14 in the overall moving picture AM1 to be played.

In the modification of the moving-picture data item, the main processor 150 serves as an overall-moving-picture generator for changing the description of locations of the sectional moving picture SM21 to SM24 in the choices-of-answers data item (original overall-moving-picture data item) included in the read-out quiz data element, so that the changed description satisfies the determination of the locations of the sectional moving pictures SM11 to SM14 in the overall moving picture AM1, thereby generating a new or processed overall-moving-picture data item indicating the overall moving picture AM1 including the sectional moving pictures SM11 to SM14 located in accordance with the determination. In other words, the main processor 150 permutes the locations of the original sectional moving pictures SM21 to SM24 in the original overall moving picture AM2. The permutation is conducted randomly. Therefore, even after the modification of the moving-picture data item, the new locations of the sectional moving pictures SM11 to SM14 in the new overall moving picture AM1 may sometimes be the same as those of the original sectional moving pictures SM21 to SM24 in the original overall moving picture AM2.

In the modification of the moving-picture data item, the main processor 150 serving as the overall-moving-picture generator generates the processed overall-moving-picture data item in such a manner that the overall moving picture AM1 to be played by the processed overall-moving-picture data item includes the boundary picture DM.

In the modification of the location data item, the main processor 150 serves as a location data modifier for modifying the initial location data item in the read out quiz data element in accordance with the modification of the choices-of-answers data item. In other words, based on the determination of the locations of the sectional moving pictures SM11 to SM14 in the overall moving picture AM1, the main processor 150 modifies the correlation, described in the initial location data item, between the sectional-moving-picture areas and the sectional moving pictures, thereby generating a new or modified location data item. Thus, the processed quiz data element includes the newly generated overall-moving-picture data item and the modified location data item. The main processor 150 writes the processed quiz data element as the processed data element 182 into the main memory 180 that is the overall-moving-picture memory and the location data memory.

The main processor 150 then conducts a quiz process (S4). In the quiz process, the main processor 150 conducts a question asking process (S4A) for asking the question to be asked and for presenting choices of answers to the question, whereas the main processor 150 conducts an accepting process (S4B) for accepting the selection of a choice by the human player. In the question asking process, the main processor 150 serves as the question asker and supplies to the display controller 160 a display instruction for asking the question to be asked. As a result, as shown in FIG. 2, an image of the question sentence is shown in the question area QR of the screen 121 of the display unit 120.

In the question asking process, the main processor 150 serves as a presenter for supplying to the display controller 160 a moving picture display instruction for presenting choices of answers to the question. The moving picture display instruction contains a moving picture specifying data item specifying the overall-moving-picture data item in the processed data element 182. The moving picture display instruction also contains an area specifying data item specifying the group-of-choice area AR in the screen 121 of the display unit 120. Upon receiving the moving picture display instruction, the display processor 162 of the display controller 160 serves as a moving-picture player for conducting a moving picture playing process. To be more precise, the display processor 162 writes one by one sequentially, into the storage area corresponding to the specified group-of-choice area AR in the frame buffer FB, a plurality of image data items (corresponding to the plurality of sectional moving pictures SM11 to SM14) for displaying a plurality of rectangular images which constitute the overall moving picture AM1 which is displayed in accordance with the specified overall-moving-picture data item. As a result, as shown in FIG. 2, the group-of-choice area AR is occupied by the overall moving picture AM1, the choice-of-answer area (sectional-moving-picture area) SR1 by the sectional moving picture SM14, the choice-of-answer area SR2 by the sectional moving picture SM12, the choice-of-answer area SR3 by the sectional moving picture SM11, and the choice-of-answer area SR4 by the sectional moving picture SM13.

In the accepting process, the main processor 150 serves as a selection acceptor for determining whether the selection by the human player (user) of at least one of the plurality of choice-of-answer areas (sectional-moving-picture areas) SR1 to SR4 has been accepted or not (S4B1). When the determination is negative, the main processor 150 determines whether the elapsed time from the start of the accepting process exceeds a time limit or not (S4B1). When the determination of step S4B1 is negative, the routine returns to step S4B1. In other words, until a selection by the human player of a choice-of-answer area is accepted or until the elapsed time exceeds a time limit, the main processor 150 waits for the selection of a choice-of-answer area. The determination of step S4B1 is positive when the human player touches any one of the choice-of-answer areas SR1 to SR4, and is negative in other cases.

The time limit is a predetermined fixed time period for limiting the time period for accepting the selection of choices and is, for example, 60 seconds. The screen 121 includes an image showing the remaining time period, which is the time limit minus the elapsed time (in FIG. 2, "09 SECONDS"). In the present embodiment, the starting time point of the accepting process and the starting time point of the question asking process are the same. However, the accepting process may start after starting the question asking process.

If the determination of step S4B1 or step S4B2 is positive, the main processor 150 ends the quiz process, and executes a next process. To be more precise, if the quiz process ends when the determination of step S4B2 is positive (since the elapsed time exceeds the time limit), the main processor 150 conducts an incorrect answer process (S5).

In the incorrect answer process, the main processor 150 first supplies the above-mentioned stop instruction to the display controller 160, thereby stopping display of the overall moving picture AM1 in the screen 121. Then, the main processor 150 (information outputter) conducts a process of controlling the display controller 160 (information outputter) to cause the screen 121 of the display unit 120 (information outputter) to display an image informing that the selected choice of answer is incorrect, and a process of causing the speakers 131 of the sound emitter 130 (information outputter) to emit a sound informing that the selected choice of answer is incorrect. Accordingly, the human player is informed that the selected choice of answer is incorrect. Then, the main processor 150 initializes the number of successive correct answers.

On the other hand, if the quiz process ends when the determination of step S4B1 is positive (since a selection of one of choice-of-answer areas SR1 to SR4 has been accepted), the main processor 150 serves as a sectional-moving-picture determiner for determining the choice of answer corresponding to the accepted selection (the selected choice-of-answer area) on the basis of the selected choice-of-answer area and the location data item included in the processed data element 182 (S6). Then, the main processor 150 (information outputter) determines whether the determined choice of answer is correct or not on the basis of the determined choice of answer (the selected choice of answer) and the correct answer data item included in the processed data element 182 (S7). If the determination is negative, the routine proceeds to step S5. If the determination is positive, the main processor 150 conducts a correct answer process (S8).

In the correct answer process, the main processor 150 first supplies the above-mentioned stop instruction to the display unit 160, thereby stopping display of the overall moving picture AM1 in the screen 121. Then, the main processor 150 (information outputter) conducts a process of controlling the display controller 160 (information outputter) to cause the screen 121 of the display unit 120 (information outputter) to display an image informing the human player that the selected choice of answer is correct, and a process of causing the speakers 131 of the sound emitter 130 (information outputter) to emit a sound informing that the selected choice of answer is correct. Then, the main processor 150 renews the data 181 indicating the number of successive correct answers in such a way that the number of successive correct answers is incremented by one.

After completion of the correct answer process or the incorrect answer process, the main processor 150 determines whether or not the next question can be asked (S9). The criterion of this determination should be defined suitably depending on the specification of the quiz game. For example, if the quiz game is a type which ends after a certain number of quiz processes, the determination of step S9 will be determining as to whether the number of finished quiz processes reaches the certain number or not. If the quiz game is another type that ends by expiration of a certain time, the determination of step S9 will be determining as to whether or not the elapsed time from the start of the quiz game is the certain time or greater. If the determination of step S9 is positive, the game process returns to step S2. Thereafter, the above-mentioned routine is repeated.

Effects

As has been described above, the moving picture processing device 100 includes the main memory 180, the storage unit 170, the display controller 160, the display unit 120, and the main processor 150. In the main memory 180, the overall-moving-picture data item for playing the overall moving picture AM1 and the location data item for correlating the choice-of-answer areas SR1 to SR4 with the sectional moving pictures SM11 to SM14 are written. The storage unit 170 stores the correct answer data item indicating the correct choice of answer. The display controller 160 and the display unit 120 play the overall moving picture AM1 by using the overall-moving-picture data item written in the main memory 180. The main processor 150 asks a question to the human player, and causes the display controller 160 and display unit 120 to play the overall moving picture AM1 for displaying the plurality of sectional moving pictures SM11 to SM14 as choices of answers to the question. The main processor 150 accepts at least one selection by the human player of a sectional area from among the plurality of choice-of-answer areas SR1 to SR4. The main processor 150 determines, from among the plurality of sectional moving pictures SM11 to SM14, a sectional moving picture corresponding to the human player's selection on the basis of the location data item written in the main memory 180. The main processor 150 determines whether or not the determined sectional moving picture (one of SM11 to SM14) is correct on the basis of the determined sectional moving picture and the correct data item stored in the storage unit 170, and outputs information depending on the determination.

Therefore, by using the moving picture processing device 100, the above-mentioned quiz process can be conducted. Furthermore, in the moving picture processing device 100, the display controller 160 and the display unit 120 play the overall moving picture AM1 by using the overall-moving-picture data, whereby the plurality of sectional moving pictures SM11 to SM14 is displayed. In other words, displaying a single moving picture enables a plurality of moving pictures to be displayed. Therefore, by using the moving picture processing device 100, it is possible to simultaneously display more moving pictures than those determined depending on the device's capacity to play moving pictures.

In the moving picture processing device 100, the storage unit 170 stores the original overall-moving-picture data item for playing the original overall moving picture AM2 and the initial location data item which correlates the plurality of original sectional areas with the plurality of original sectional moving pictures SM21 to SM24, respectively, in which the original sectional areas correspond to the plurality of sectional areas SR1 to SR4, respectively. The main processor 150 reads out of the storage unit 170 the original overall-moving-picture data item, modifies it in such a manner that the locations of the original sectional moving pictures SM21 to SM24 in the original overall moving picture AM2 are permuted, and writes the modified overall-moving-picture data item as the overall-moving-picture data item into the main memory 180. In addition, the main processor 150 reads out of the storage unit 170 the initial location data item, modifies it in accordance with the modification applied to the original overall-moving-picture data item, and writes the modified location data item as the location data item into the main memory 180.

Therefore, it is possible for the moving picture processing device 100 to manage the correlation between the plurality of sectional moving pictures and the plurality of sectional areas SR1 to SR4, and at the same time to play an overall moving picture AM1 in which the sectional moving pictures SM11 to SM14 are located at sectional areas that are different from the original sectional moving pictures SM21 to SM24 in the original overall moving picture AM2. That is, it is possible to play a variety of the overall moving pictures AM1. This contributes to obtaining suitable game results. More specifically, an unsuitable situation in which a human player who remembers the location of the correct answer can answer correctly is unlikely to happen.

According to the moving picture processing device 100, the overall moving picture AM1 includes the boundary picture DM which is a moving picture representing boundary lines separating the sectional moving pictures SM11 to SM14. Therefore, according to the moving picture processing device 100, each of the sectional moving pictures SM11 to SM14 is easily recognized as a separate moving picture. However, in another embodiment, another boundary picture different from the boundary picture DM shown in FIG. 2 may be used.

In the moving picture processing device 100, the original overall-moving-picture data item (choices-of-answers data item) stored in the storage unit 170 is compression-coded. Therefore, it is possible to lower the requirement of storage capacity for the storage unit 170. The original overall-moving-picture data item is compression-coded in accordance with VC1. Since VC1 uses intra-frame coding, use of the moving picture processing device 100 results in enhancing compression efficiency in comparison with another scheme in which individual moving picture data items for respective choices of answer are compression-coded with VC1. However, in other embodiments, it is possible to use a different video compression technique that uses intra-frame coding, or it is possible not to use any video compression techniques.

Modifications

Figure 6:
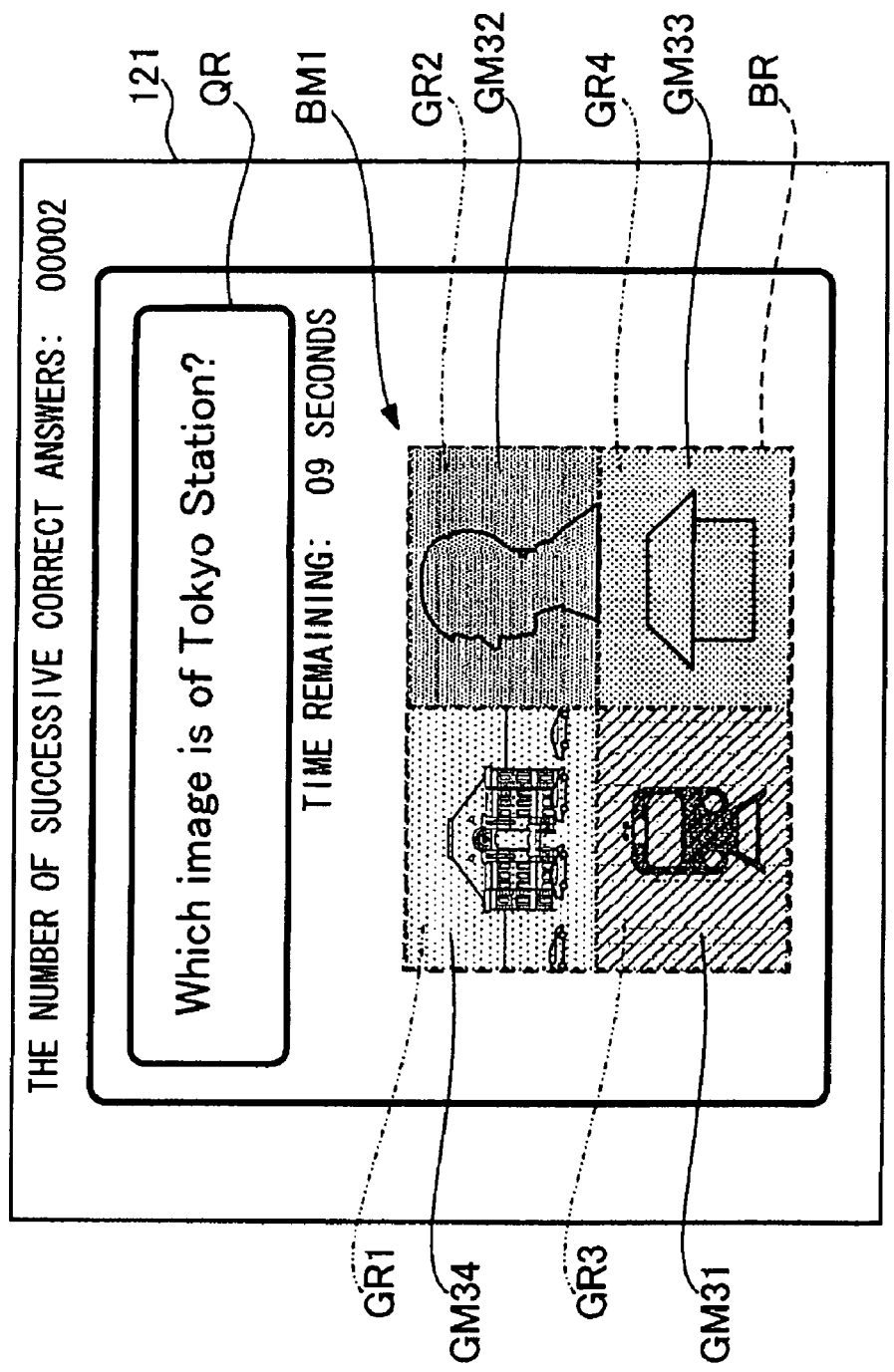
FIG. 6 is a diagram showing an example of images shown by the moving picture processing device according to a modified embodiment of the present invention.

FIG. 6 is a diagram showing an example of images shown by the moving picture processing device according to a modification of the above embodiment. FIG. 6 shows a group-of-choice area BR, choice-of-answer areas GR1 to GR4, an overall moving picture BM1, and sectional moving pictures GM11 to GM14 that correspond to the above-described group-of-choice area AR, choice-of-answer areas SR1 to SR4, the overall moving picture AM1, and the sectional moving pictures SM11 to SM14, respectively. As will be apparent from FIG. 6, there is nothing equivalent to the boundary picture area DR and the boundary picture DM, and as a result, the group-of-choice area BR is only made up of the choice-of-answer areas GR1 to GR4.

Figure 7:
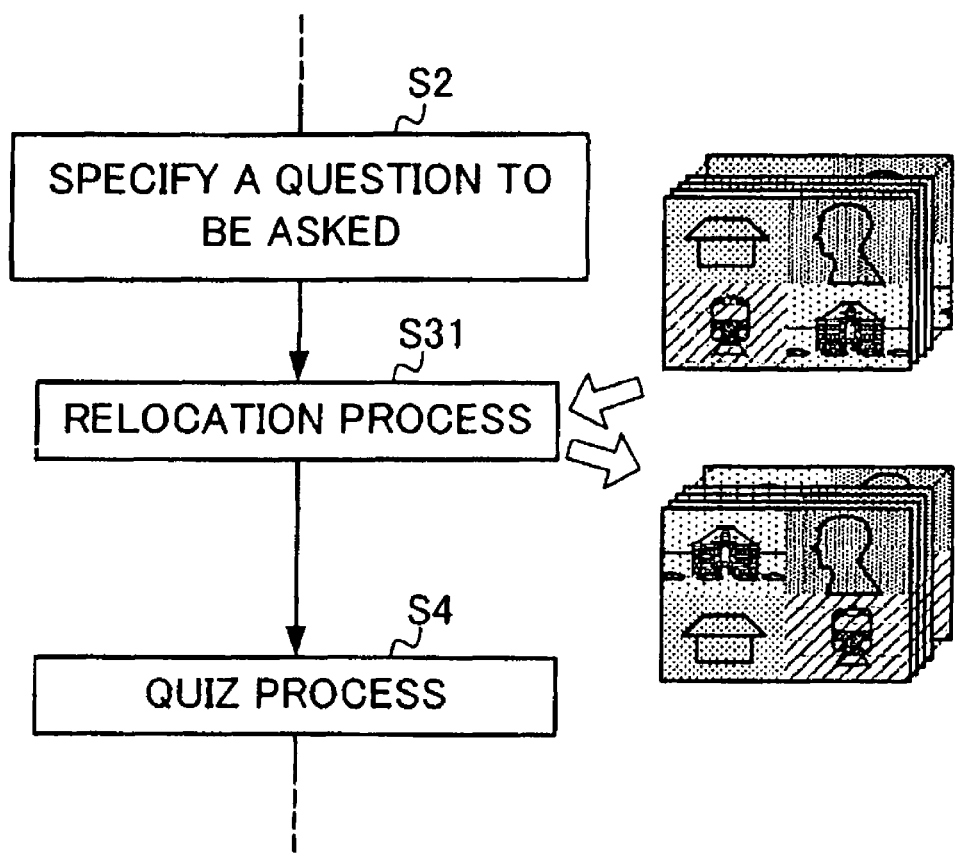
FIG. 7 is a diagram showing a part of a flowchart of a game process executed by the main processor of the moving picture processing device according to the modified embodiment of the present invention.

FIG. 7 is a diagram showing a part of a flowchart of a game process executed by the main processor 150 of another moving picture processing device according to this modification. In FIG. 7, step S31 corresponds to step S3 of FIG. 5. The difference between step S31 and step S3 is the modification of the moving-picture data item. In step S31, the choices-of-answers data item (original overall-moving-picture data item) included in the read-out quiz data element is modified to become an overall-moving-picture data item in such a way that the plurality of original sectional moving pictures SM21 to SM24 in the original overall moving picture AM2 are permuted. That is, the process in relation to the boundary picture DM is not conducted. Other features in this game process are the same as those in the above-described game process shown in FIG. 5.

In another embodiment, the overall-moving-picture data item may be compression-coded, and then the moving picture display instruction may be supplied to the display controller 160. However, in this case, the display controller 160 needs to have a function for decoding the compression-coded moving picture data item. If it is possible to use a video compression technique that allows the permutation of the locations of the sectional moving pictures without decoding compression-coded moving picture data, the process for decoding the original overall-moving-picture data item may be eliminated, and an overall-moving-picture data item may be generated directly from the compression-coded original overall-moving-picture data item.

In the above-described embodiment, each of the sectional moving pictures SM11 to SM14 occupies the entirety of one of the choice-of-answer areas SR1 to SR4. However, in another embodiment, each of the sectional moving pictures SM11 to SM14 may occupy a part of one of the choice-of-answer areas SR1 to SR4. In an alternative embodiment, each of the sectional moving pictures SM11 to SM14 may extend beyond the choice-of-answer area. Furthermore, the sectional moving pictures SM11 to SM14 may or may not have the same size and shape (be congruent).

In another embodiment, a streaming play may be used. That is, in the above-described embodiment, after the entire overall-moving-picture data item is written into the main memory 180, the overall moving picture AM1 based on the overall-moving-picture data item is played. However, this may be modified in such a way that before a part of the overall-moving-picture data item is written into the main memory 180, the overall moving picture AM1 may start to play on the basis of the overall-moving-picture data item.

Furthermore, in another embodiment, another process that is different from quiz games may be executed. However, even in this case, it is preferable to output information depending on the determined sectional moving picture (one of SM11 to SM14). The information output may be light, sound, vibration, and other suitable information that human beings can perceive. The output information in the form of light may be, not only the displaying of an image, but also the blinking of a light emitting diode (LED). An example of displaying an image is displaying a moving picture. The output information in the form of sound may be, not only sounding of speakers, but also driving a sound generating mechanism by a solenoid (for example, the sound of a bell). The output information in the form of vibration may be driving a vibrator.

In the above-described embodiment, the material of the overall-moving-picture data item is the original overall-moving-picture data item that includes a plurality of original sectional-moving-picture data items and indicates an original overall-moving picture in which a plurality of sectional moving pictures is located in advance. However, in another embodiment, the overall-moving-picture data item may be generated from a set including a plurality of independent original sectional-moving-picture data items.

Although particular embodiments of the present invention have been described, the present invention may be practiced as a computer program including a machine-readable sequence of instructions describing the above-disclosed method or as a program product that bears the computer program. Such a "program product" may be a computer-readable information recording medium that stores the computer program, or may be a data carrier that transfers the computer program. Such an "information recording medium" may be in the form described above or may be one of various kinds of disks, tapes, chips, or sticks. Such a "data carrier" may be one of various kinds of networks including both wired and wireless networks. The program may be provided in a compiled or non-compiled form.

The above-described moving picture processing device is a stand-alone computer. However, the moving picture processing device may be a computer system including a plurality of computers that communicate with each other and share the above-described functions.

The invention claimed is:

1. A moving picture processing device comprising:
   an overall-moving-picture memory into which an overall-moving-picture data item for use in playing an overall moving picture is written, the overall moving picture occupying an image area comprising a plurality of sectional areas that do not overlap each other, the overall moving picture having a playing time and comprising a plurality of sectional moving pictures each having a playing time that is the same as the playing time of the overall moving picture, the sectional moving pictures being located at the sectional areas, respectively;
   a moving-picture player for playing the overall moving picture using the overall-moving-picture data item written into the overall-moving-picture memory;
   a location data memory into which a location data item is written, the location data item describing locations of the plurality of sectional moving pictures within the overall moving picture, the location data item describing a correlation between the plurality of sectional areas and the plurality of sectional moving pictures;
   a selection acceptor for accepting selection of at least one sectional area from among sectional areas by a user;
   a sectional-moving-picture determiner for determining, among the plurality of sectional moving pictures, a sectional moving picture correlated to the sectional area accepted by the selection accepter on the basis of the location data item written into the location data memory; and an information outputter for outputting information in accordance with the sectional moving picture determined by the sectional-moving-picture determiner.

2. The moving picture processing device according to claim 1, further comprising:
an original-picture-data memory for storing in advance a plurality of original sectional-moving-picture data items that are originals of a plurality of sectional-moving-picture data items indicating the plurality of sectional moving pictures within the overall moving picture;
an initial location data memory for storing in advance an initial location data item describing an initial correlation between the plurality of sectional areas and the plurality of sectional moving pictures;
a picture location determiner for determining locations of the sectional moving pictures within the overall moving picture;
an overall-moving-picture generator for generating, from the original sectional-moving-picture data items read from the original-picture-data memory, the overall-moving-picture data item indicating the overall moving picture comprising the sectional moving pictures that are located in accordance with the determination by the picture location determiner, the overall-moving-picture generator writing the overall-moving-picture data item into the overall-moving-picture memory; and
a location data modifier for reading the initial location data item from the initial location data memory, and for modifying the initial correlation between the plurality of sectional areas and the plurality of sectional moving pictures described in the initial location data item on the basis of the locations determined by the picture location determiner, thereby generating a new location data item, the location data modifier writing the new location data item into the location data memory.

3. The moving picture processing device according to claim 2, wherein the original-picture-data memory stores in advance an original overall-moving-picture data item comprising the plurality of original sectional-moving-picture data items, the original overall-moving-picture data item indicating an original overall moving picture in which the plurality of sectional moving pictures are located in accordance with the initial correlation described in the initial location data item;
and wherein the overall-moving-picture generator generates the overall-moving-picture data item by changing, on the basis of the determination by the picture location determiner, a description of locations of the sectional moving pictures in the original overall-moving-picture data item read from the original-picture-data memory.

4. The moving picture processing device according to claim 2, wherein the overall-moving-picture generator generates the overall-moving-picture data item in such a manner that the overall-moving-picture data item comprises a boundary picture data item indicating a boundary picture, the boundary picture being a picture of a boundary for dividing the plurality of sectional moving pictures.

5. The moving picture processing device according to claim 3, wherein the original overall-moving-picture data item stored in the original-picture-data memory is compression-coded, and wherein the overall-moving-picture generator decodes the original overall-moving-picture data item read from the original-picture-data memory prior to the generation of the overall-moving-picture data item.

6. The moving picture processing device according to claim 1, further comprising:
a question asker for asking a human player a question;
a presenter for showing the plurality of sectional moving pictures as choices of answers to the question by causing the moving-picture player to play the overall moving picture; and
a correct answer memory for storing a correct answer data item indicating a correct choice of answer,
wherein the information outputter determines whether or not the sectional moving picture determined by the sectional-moving-picture determiner is the correct choice of answer on the basis of the sectional moving picture determined by the sectional-moving-picture determiner and the correct answer data item stored in the correct answer memory, and wherein the information outputter outputs information in accordance with the determination thereof.

7. A non-transitory computer readable medium having stored thereon a computer program used in a computer comprising:
an overall-moving-picture memory into which an overall-moving-picture data item for use in playing an overall moving picture is written, the overall moving picture occupying an image area comprising a plurality of sectional areas that do not overlap each other, the overall moving picture having a playing time and comprising a plurality of sectional moving pictures each having a playing time that is the same as the playing time of the overall moving picture, the sectional moving pictures being located at the sectional areas, respectively;
a moving-picture player for playing the overall moving picture using the overall-moving-picture data item written into the overall-moving-picture memory; and
a location data memory into which a location data item is written, the location data item describing locations of the plurality of sectional moving pictures within the overall moving picture, the location data item describing a correlation between the plurality of sectional areas and the plurality of sectional moving pictures, the computer program causing the computer to serve as:
a selection acceptor for accepting selection of at least one sectional area from among sectional areas by a user;
a sectional-moving-picture determiner for determining, among the plurality of sectional moving pictures, a sectional moving picture correlated to the sectional area accepted by the selection accepter on the basis of the location data item written into the location data memory; and
an information outputter for outputting information in accordance with the sectional moving picture determined by the sectional-moving-picture determiner.

8. The moving picture processing device according to claim 1, wherein among said overall-moving picture and said sectional moving pictures, a plurality of moving pictures are displayed simultaneously.

9. The moving picture processing device according to claim 1, wherein said overall moving picture memory comprises a frame buffer.

* * * * *